United States Patent [19]

Adee

[11] Patent Number: 4,743,740
[45] Date of Patent: May 10, 1988

[54] BURIED ELEMENT DEICER

[75] Inventor: James M. Adee, San Diego, Calif.

[73] Assignee: Rohr Industries, Inc., Chula Vista, Calif.

[21] Appl. No.: 785,383

[22] Filed: Oct. 7, 1985

[51] Int. Cl.$^4$ .......................... H05B 3/10; H01C 3/12; B22B 31/00; B64D 15/00
[52] U.S. Cl. .................................... 219/548; 219/528; 219/535; 219/547; 219/549; 338/292; 338/293; 156/273.9; 156/275.5; 156/293; 156/295; 244/134 R
[58] Field of Search .............. 219/528, 535, 547, 548, 219/549; 338/292, 293; 244/134 R; 156/273.9, 275.5, 293, 295

[56] References Cited

U.S. PATENT DOCUMENTS

| | | |
|---|---|---|
| 1,321,462 | 11/1919 | Line . |
| 3,099,540 | 7/1963 | Eiscer . |
| 3,925,979 | 12/1975 | Ziegler . |
| 3,961,157 | 6/1976 | Miller et al. ........................ 219/345 |
| 4,368,093 | 1/1983 | Hay, II .............................. 156/443 |
| 4,574,186 | 3/1986 | Sauai et al. ......................... 219/528 |

Primary Examiner—E. A. Goldberg
Assistant Examiner—Gerald E. Preston
Attorney, Agent, or Firm—Patrick J. Schlesinger; Frank D. Gilliam; Jay M. Cantor

[57] ABSTRACT

A perforated flat ribbon heating element embedded or sandwiched between the porous material and perforated sheet of honeycomb acoustic panel material used for sound suppression and deicing on ice buildup areas of an aircraft engine.

8 Claims, 3 Drawing Sheets

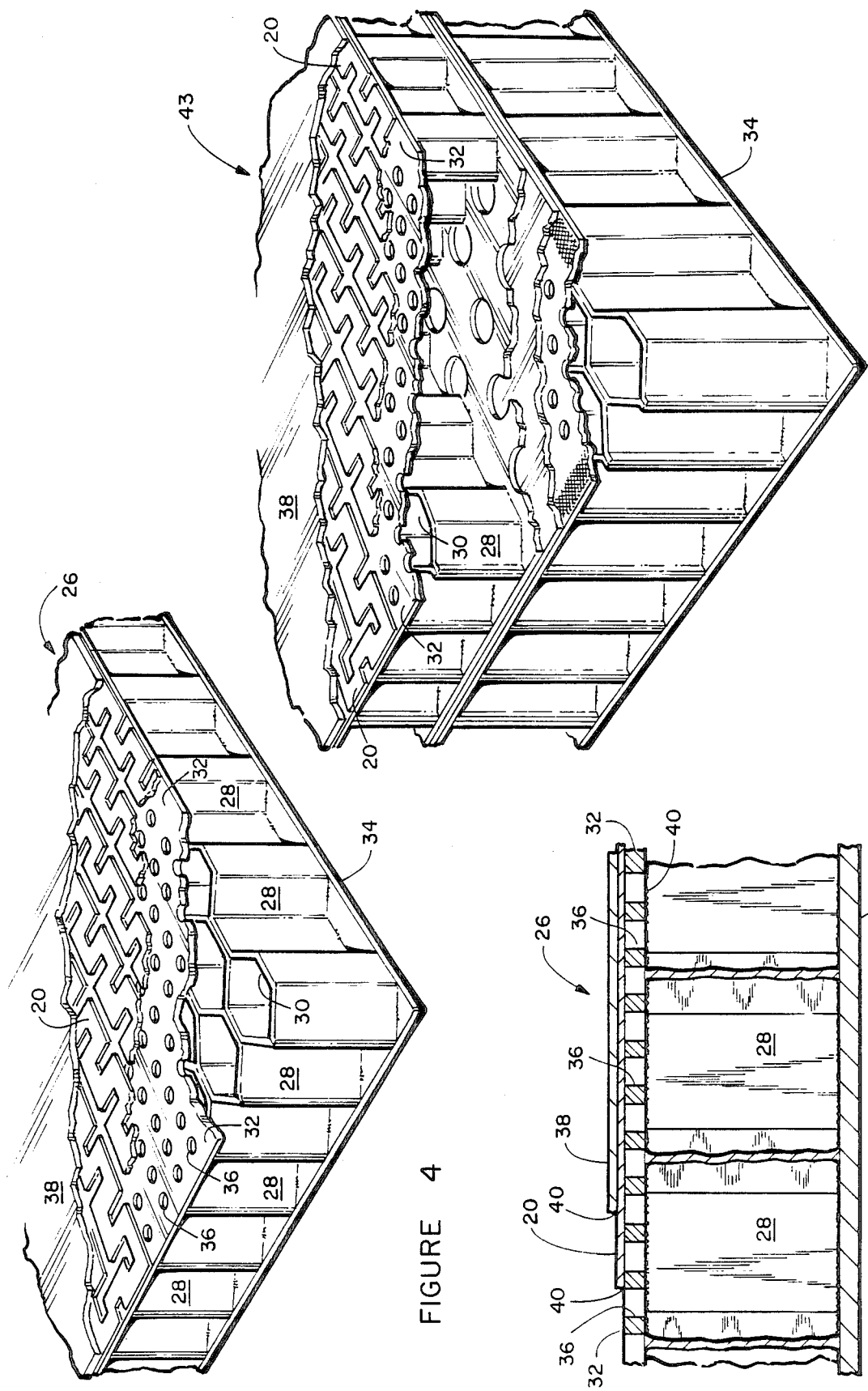

BURIED ELEMENT DEICER

BACKGROUND OF THE INVENTION

1. Field of the Invention

The invention is directed to the removal or prevention of ice buildup on aircraft surfaces, and more particularly to the incorporation of a perforated heating element which forms one lamination layer within the laminated layers of perforated sound attenuation or suppression structures associated with a gas turbine engine.

2. Brief Description of the Prior Art

The application of gas turbine engines to aircraft has introduced a serious icing problem in view of the particular vulnerability of gas turbine engines to ice formation. The formation of ice on such air intake components as the intake fairing, the nose bullet, and the struts supporting the front bearing of the engine, causes serious obstruction to the flow of air passing into the engine compressor and may cause considerable damage resulting from pieces of ice breaking loose from such components and being carried by the air stream into damaging contact with the rotating parts of the engine. Prior art methods for alleviating this problem include the introduction of alcohol, hot gases, and by the application of heat to the ice buildup areas.

A de-icing liquid such as, alcohol can only be used where actual ice buildup is detected and, because of the weight of such liquid, only small quantities can be carried in the aircraft and, therefore, can only be sparingly used.

Heated air bled from the gas turbine engine is very very effective and can be continuously applied. However, heated air cannot be used in all areas required because modern aircraft employ Helmholtz resonant acoustic material and other similar types of material for sound suppression in ice buildup areas. Helmholtz and similar acoustic material generally employ a multiplicity of perforations in their outer surface thereby making the use of heated air to preclude ice formation impracticable.

Examples of the prior art acoustic laminate material to which the present invention is generally directed, can be found in U.S. Pat. Nos. 4,254,171; 4,318,453; 4,379,191; 4,384,020; and 4,421,811, all of which are assigned to the assignee of the instant invention.

Until the emergence of this invention there has not been an effective way to eliminate ice buildup on acoustically treated aircraft surfaces.

SUMMARY OF THE INVENTION

The invention is directed to the insulative placement of electrically continuous thin strips of heating element material as one layer in a multi-layer acoustic laminate material that produces a composite system which performs its normal acoustic functions and that in, addition prevents ice buildup.

A general description of the acoustic material taught by the above referenced patents is a laminate buildup comprising a honeycomb core constructed of aluminum or the like sandwiched between a perforate sheet and an imperforate sheet. The perforate sheet includes an overlay of porous material which is exposed to air flow. Such acoustic material is used in areas of excessive noise such as is produced at the front of a fan-jet engine or the like. The present invention is directed to the sandwiching of a thin layer of flat ribbon electrical heating element between the perforate sheet and porous material. In order to maintain the through fluid resistance between the outer surface of the porous material and the cells of the honeycomb material, the layer of heating element must also include perforations which align with the normal perforation pattern of the perforate sheet. The heating element can be perforated prior to its intended use or can be adhered to an imperforate sheet and the heating element and imperforate sheet can then be simultaneously perforated. The latter method is preferable as preperforated material may present a perforation alignment problem when later joined.

The joined materials can be perforated by any convenient method. The preferred method is by grit blasting as set forth in patent application Ser. No. 752,088 filed July 5, 1985. As set out in that patent application, any shape of material can be perforated, including planar, curvilinear, compound curved, etc.

An object of this invention is to provide a combined laminate material that provides sound suppression and prevents ice buildup in and around aircraft engines.

Another object of this invention is a method of providing ease of manufacturing of the combined acoustic material and heating element.

Still another object of this invention is to provide a method of perforating a combined imperforate sheet and heating element.

These and other objects and advantages of the invention will become better understood by reference to the following detailed description, when considered with the drawings, in which:

BRIEF DESCRIPTION OF THE DRAWINGS

FIG. 4 is a perspective view of a single degree acoustic panel employing the present invention;

FIG. 5A is a fragmentary vertical section of the panel of FIG. 4;

FIG. 6 is a perspective view partially cut away, of a double degree acoustic panel employing the invention.

DETAILED DESCRIPTION OF THE INVENTION

Figure 1:
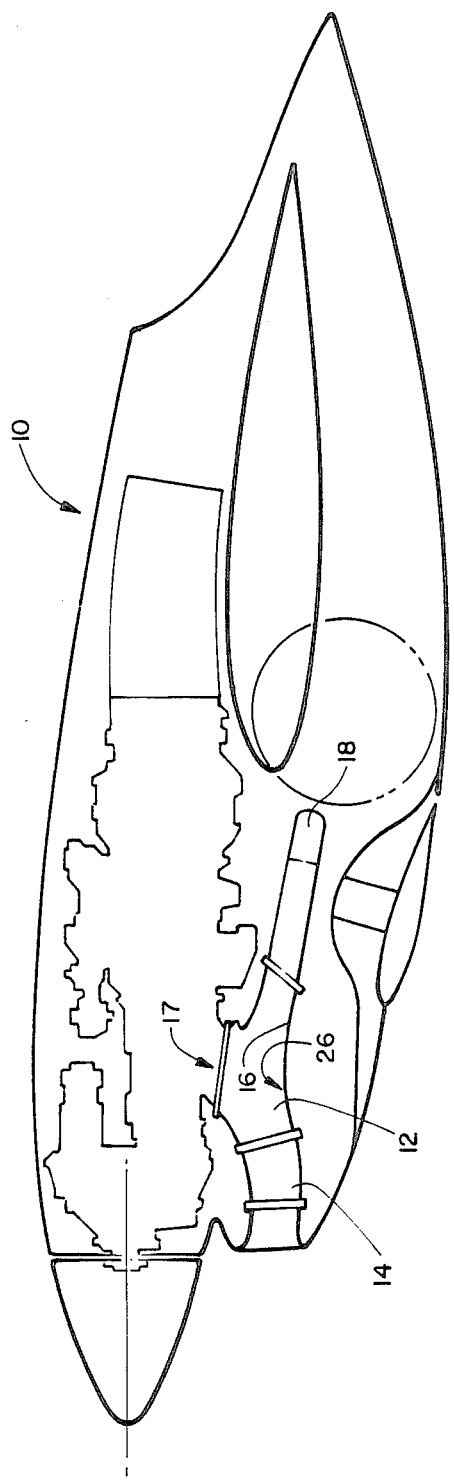
FIG. 1 is a simplified side view of a portion of an aircraft propulsion system, shown partially in cut-away, and illustrating an exemplary air inlet for a turbo-prop engine.

Referring now to the drawings in detail. A typical turbo-prop aircraft engine installation 10 is shown in FIG. 1. An engine air inlet duct 12 is shown in its operating position relative to an aircraft engine 13.

Figure 2:
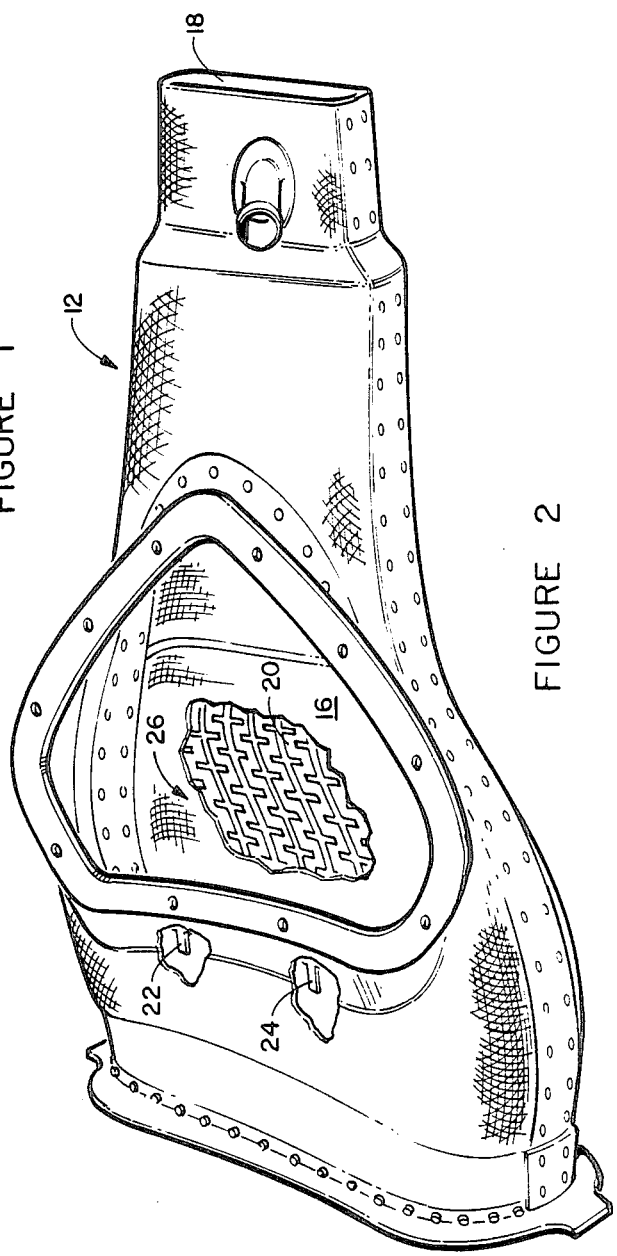
FIG. 2 is a perspective, partially cut away view of the air inlet seen in FIG. 1.

The engine air inlet duct 12 of FIG. 2 includes an ambient air inlet 14, a bottom or floor surface 16, an engine air inlet 17 and a conventional by pass opening 18. The by-pass 18 is provided to permit a bird or other foreign object entering the duct 12 to by-pass the engine air inlet 17 and not be ingested by the engine 13.

Referring now to FIG. 2, the engine air inlet duct 12 is shown in perspective. The bottom or floor surface 16 of the duct is constructed of a honeycomb sound attenuation material laminate with an outer porous surface as for example that set forth in U.S. Pat. Nos. 4,379,191, 4,421,811 and others owned by the Assignee of the present invention. As desired or required, other surfaces of the duct 12, such as an upper surface, may be composed of the acoustic material of the present invention. An ice buildup prevention, either anti-icing or deicing, electric heating element 20 is embedded and electrically insulated as required from adjacent laminate layers, hereinafter described in more detail. The ends 22 and 24 of the heating element 20 are connected to a suitable electric source not shown. Electric power sources for supplying electrical power to the heating element 20 are all well known in the art. For reasons of economy in the use of energy, such an electric power source will preferably supply power to the heating element 20 on an intermittent basis.

Figure 3:
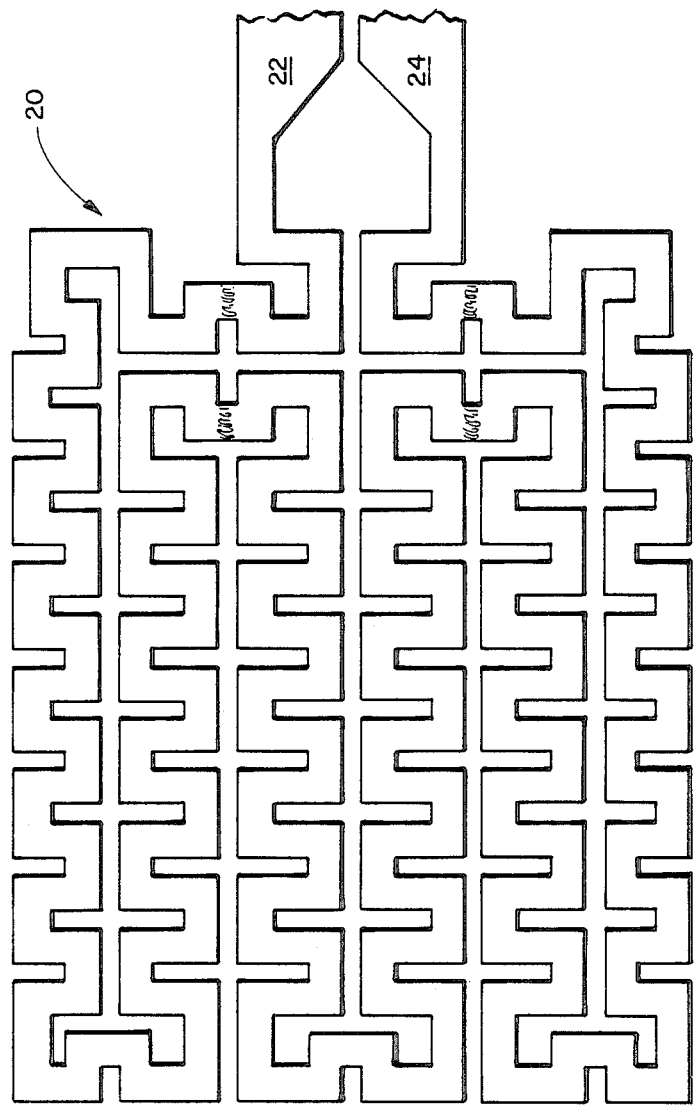
FIG. 3 is a plan view of the flat ribbon heating element of the invention.

FIG. 3 depicts a typical grid pattern for the heating element 20. The heating element 20 takes the form of a thin electrical resistive metal foil or ribbon element constructed from such as, by way of example, and not by way of limitation, stainless steel, copper, wire cloth, etc. The foil or ribbon element is very thin, having a thickness in the range of 0.01 to 0.015" so that it can easily be embedded within the layers of the acoustic laminate without affecting its sound suppression characteristics or adding significant weight or bulk to the acoustic sandwich. The electrical connections 22 and 24 are extended externally from the laminated panel at any convenient location for ease of their connection to a suitable electric power source. Although only one heating element 20 is shown in FIG. 3 it should be understood that a plurality of separate heating elements 20 with separate electrical connections could be embedded within a single cowl. It should be further understood that heating elements as described herein can be utilized in any aircraft acoustical laminate location where ice is likely to form, i.e. the invention is not limited as depicted.

Referring now to FIGS. 4 and 5, a portion of the acoustical panel of the present invention as well as a vertical end section thereof is shown. The acoustical laminate 26 includes a single honeycomb core 28 having the usual multiplicity of endwise directed cells 30 therein, and with thin outer facing sheets 32, 34.

Facing sheet 32 of the finished panel is perforated with a multiplicity of small perforations 36. Sheet 34 is imperforate. The core 28 and facing sheets 32, 34 may be constructed of like or unlike material. For use in aircraft jet engines inlets and nacelle structures, for example, such materials as aluminum, stainless steel, advanced composites, titanium and the like may be preferred. The face sheets 32, 34 are selected of sufficient thickness to carry the required loads commonly encountered.

The heating element 20 is positioned between the perforate face sheet 32 and a porous outer sheet 38 and is electrically insulated and adhesively bonded to both. This porous sheet for use in aircraft applications is generally constructed of metallic fibrous felt, metal fabric or of metal fibers woven in a conventional manner as for example, in a Dutch twill weave. The porous material 38 may be constructed of various other fibrous materials including, but not limited to, graphite or the like, metal, as well any organic or in-organic non-metallic material suitable for the purpose intended.

The method of manufacture of the acoustic laminate without the heater element embedded therein is set forth in U.S. Pat. No. 4,254,171 and is hereby incorporated by reference.

The preferred method of construction of the laminate panel including the heating element is to first bond the heating element 20 to one surface of an imperforate sheet with a suitable bonding medium 40 that not only securely bonds the heating element 20 to the imperforate sheet but electrically insulates it therefrom as well. A typical adhesive used for such bonding is for example a glass cloth prepreg with a modified epoxy resin. For the bonding, one surface of the imperforate sheet is coated with the selected adhesive and the heating element 20 is positioned thereon. A second layer of adhesive may then be placed over the heating element 20. The adhesive layer or layers are then cured either at an elevated temperature or at ambient temperature. After the adhesive layers have cured, the now combined imperforate sheet and heating element are perforated with a plurality of perforations in a desired pattern and diameter. The perforations can be formed by any suitable method such as drilling, laser burning, by grit blasting, as set forth in prior patent application having Ser. No. 752,088 filed on July 5, 1985 and assigned to the assignee of the instant invention, or any other convenient means. The grit blasting as set forth in the referenced patent application is the preferred method as the resulting perforations are uniform, smooth, and do not require additional finishing. Delamination of the elements is also prevented. While the present invention has been described with the understanding that the electrical heating element 20 would be conductive and that the fibrous porous layer 38, such as a stainless steel fabric, would also be conductive and an insulative layer would be required between the metal porous fabric and the conductive heating element 20, it should be apparent that the degree of care taken in insulating the element 20 from adjacent layers will be dictated by whether the porous layer 38 and the imperforate sheet 30 to be perforated are conductive.

An alternate method is to first perforate the imperforate sheet and heating element with a like perforation pattern prior to their bonding. In this alternative method, the perforations of the perforate sheet and heater element must be aligned when bonding and the chosen bonding medium, in addition to bonding and electrically insulating the elements, must not flow into and block the perforations. The bonding medium would be as set forth in the referenced patents directed to acoustic laminates hereinbefore mentioned. Typically the bonding medium is an adhesive with a low solvent content. In this method of manufacture the bonding medium would be applied to one surface of the perforate sheet 30 and the perforated heating element 20 would then be positioned thereon, the perforations of the two are aligned and the bonding medium is then cured as required.

The now bonded together and electrically insulated perforate sheet 30 and heating element 20 are now ready to receive the porous material 38. The outer surface of the heating element and the adjacent exposed surface of the perforated sheet are coated with the low solvent content adhesive, as hereinbefore noted, the porous material 38 is then positioned on the heating element side of the combined elements and the elements are then secured together by any convenient means and pressure is applied and maintained until the last layer of adhesive is cured. It should also be noted that the layer of adhesive between the heating element and porous material electrically insulates one from the other. After this coating of adhesive has cured, a suitable bonding medium is applied to either the opposite side of the perforated sheet or on the end surfaces of a honeycomb core 28 or both as well as one surface of the imperforate sheet 34. The honeycomb core is then positioned between the perforate sheet heater element and porous material combination and the imperforate sheet. Pressure is applied to the stacked panel elements and the bonding medium last applied is then cured.

Figure 5B:
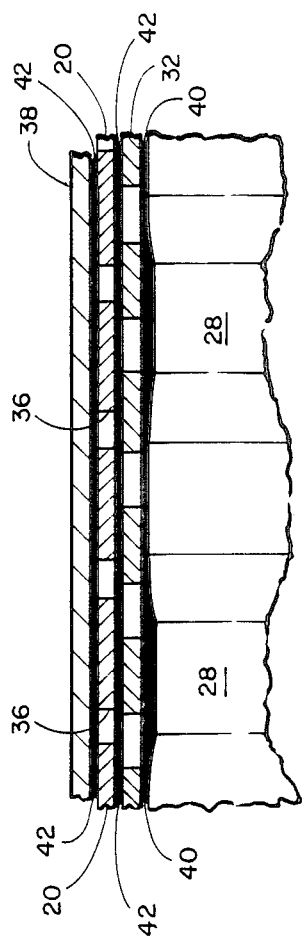
FIG. 5B is a fragmentary vertical section of the panel of FIG. 4 showing thin perforate electrical insulation sheets positioned between the heater element and adjacent material.

Referring now to FIG. 5B, in some applications of the present invention to insure complete electrical insulation of the heating element between the perforate facing sheet 32 and the porous material 38, a thin sheet of insulation material 42 is positioned between the heating element and the perforate sheet and heating element and the porous material. In the preferred method of construction mentioned above, thin sheets of electrical insulation material 42 are positioned on the upper exposed surface of the heating element and between the heating element and imperforated sheet during the bonding process. After curing, the insulation sheets are perforated as well as the heating element and imperforate sheet.

In the second method of construction mentioned above, the thin electrical insulation sheets 42 are preperforated and their perforations are aligned with the perforations of the perforated sheet 30 and heating element 20.

The remaining steps of manufacture for the two methods are the same as hereinbefore mentioned.

It is important that the bonding medium chosen to bond the porous material to the heating element and exposed surface of the perforate sheet will not flow into the pores of the porous material by capillary attraction, so that the full porosity of the porous sheet material is maintained.

Further combinations of different bonding mediums and insulation materials may be utilized, particularly where it is desirous to also reduce thermal transfer between the heating element and the perforated sheet.

Referring now to FIG. 6, a multi-layer or double degree acoustic element 43 with the heating element 20 of the present invention positioned between the outer most perforate sheet 32 and the porous material 38 is shown. This material is manufactured as set forth in U.S. Pat. No. 4,421,811, except for the insertion of the heating element between the outer most perforate sheet and porous layer. The heating element is inserted in the manner set forth above in the discussion for FIGS. 4, 5A and 5B.

While there has been shown and described the fundamental novel features of this invention as applied to the preferred embodiment, it will be understood that various omissions and substitutions and changes in the form and details of the device illustrated may be made by those skilled in the art without departing from the spirit of the invention. It is the intention therefore to be limited only by the scope of the following claims and reasonable equivalents thereof.

What is claimed is:

1. Acoustic attenuation and ice-protection material used for aircraft structures which are exposed to the sound of jet engines, other noise producing mechanisms and ice buildup, said material having a predetermined flow-through resistance, comprising:
   (a) a honeycomb core having a plurality of endwise directed cells;
   (b) an unperforated facing sheet secured to the edges of said cells along one side of said honeycomb core;
   (c) a perforated facing sheet secured to the edges of said cells along the other side of said honeycomb to form a Helmholz resonator structure with said unperforated facing sheet and said honeycomb core;
   (d) a perforated heating element secured to said perforated facing sheet, perforations in said facing sheet being in alignment with perforations in said heating element; and
   a thin sheet of porous material secured to said perforatd heating element on the side thereof remote from said perforated facing sheet.

2. The invention as defined in claim 1 wherein said heating element is formed as a thin flat ribbon.

3. The invention as defined in claim 1 wherein said heating element is tungsten ribbon.

4. The invention as defined in claim 1 wherein each end of the heating element extends externally of said material.

5. The invention as defined in claim 1 wherein said heating element is in the form of a grid pattern having a single end-to-end electrical path.

6. The invention as defined in claim 1 additionally comprising electrical insulation material interposed between said heating element and at least said porous material.

7. The invention as defined in claim 1 additionally comprising electrical insulation material interposed between said heating element and said porous material and said perforated sheet.

8. The invention as defined in claim 1, further including a modified epoxy resin bonding medium having a low solvent content for bonding said heating element between said perforate sheet and said thin sheet of porous material, said bonding medium having a melt viscosity, during the curing process, sufficiently high so that the adhesive will not flow into the pores of the porous material by capillary attraction to maintain the full porosity of the porous material over the perforations of the heating element and perforated sheet, and which, when cured, insulates the heating element electrically from both the porous material and the perforated sheet.

* * * * *